(12) United States Patent
Nguyen et al.

(10) Patent No.: US 10,843,340 B2
(45) Date of Patent: Nov. 24, 2020

(54) PROTECTED WORKER ZONES AROUND MOBILE ROBOTIC PLATFORMS THAT MANUFACTURE AIRCRAFT

(71) Applicant: The Boeing Company, Chicago, IL (US)

(72) Inventors: Thi Q. Nguyen, Everett, WA (US); Quang Tuyen Do, Renton, WA (US); Thomas Howard Sultze, Everett, WA (US)

(73) Assignee: The Boeing Company, Chicago, IL (US)

( * ) Notice: Subject to any disclaimer, the term of this patent is extended or adjusted under 35 U.S.C. 154(b) by 226 days.

(21) Appl. No.: 16/113,292

(22) Filed: Aug. 27, 2018

(65) Prior Publication Data

US 2020/0061823 A1 Feb. 27, 2020

(51) Int. Cl.

| | |
|---|---|
| *G05B 19/04* | (2006.01) |
| *G05B 19/18* | (2006.01) |
| *B25J 9/16* | (2006.01) |
| *B25J 11/00* | (2006.01) |
| *B64F 5/10* | (2017.01) |
| *G05D 1/02* | (2020.01) |

(52) U.S. Cl.
CPC ............ *B25J 9/1666* (2013.01); *B25J 9/1694* (2013.01); *B25J 11/005* (2013.01); *B64F 5/10* (2017.01); *G05D 1/024* (2013.01); *G05D 1/0214* (2013.01); *G05D 1/0223* (2013.01)

(58) Field of Classification Search
CPC ........ B25J 11/005; B25J 19/022; B25J 19/06; B25J 5/007; B25J 9/1666; B25J 9/1676; B25J 9/1694; B64F 5/10; G05B 2219/40202; G05D 1/0214; G05D 1/0223; G05D 1/024
See application file for complete search history.

(56) References Cited

U.S. PATENT DOCUMENTS

| | | | | |
|---|---|---|---|---|
| 5,436,613 | A * | 7/1995 | Ghosh | G08B 13/26 324/663 |
| 5,758,298 | A * | 5/1998 | Guldner | G01S 15/931 318/580 |
| 10,503,143 | B1 * | 12/2019 | Polic | B65G 1/0492 |
| 2004/0249508 | A1 * | 12/2004 | Suita | B25J 9/1666 700/245 |
| 2005/0055134 | A1 * | 3/2005 | Okuda | B25J 9/1666 700/245 |

(Continued)

*Primary Examiner* — Harry Y Oh
(74) *Attorney, Agent, or Firm* — Duft & Bornsen, PC (57) ABSTRACT

Mobile robotic platforms include a robotic device and a pair of laser scanners. The robotic device is positioned near a front of the mobile robotic platform while the laser scanners are positioned on the sides of the mobile robotic platform. When the mobile robotic platform is located in a selected position relative to an assembly with the front of the mobile robotic platform facing the assembly, the scanners are set to a scan field area of either a selected area for a safety zone around the sides of the mobile robotic platform or a default area within a predetermined distance from the sides. Upon detection of an intrusion into the scan field area of the laser scanners, the robotic device and/or the mobile robotic platform is stopped to prevent harm to a person whom may have inadvertently intruded into the scan field areas around the mobile robotic platform.

24 Claims, 7 Drawing Sheets

(56) References Cited

U.S. PATENT DOCUMENTS

| | | | |
|---|---|---|---|
| 2010/0194583 A1* | 8/2010 | Kawabata | H03K 17/941 340/3.6 |
| 2010/0219968 A1* | 9/2010 | Teutenberg | F16P 3/142 340/686.6 |
| 2014/0207285 A1* | 7/2014 | Sakabe | B25J 9/1676 700/259 |
| 2015/0112483 A1* | 4/2015 | Mougin | B25J 9/1676 700/253 |
| 2015/0314889 A1 | 11/2015 | Day et al. | |
| 2016/0011593 A1 | 1/2016 | Oberoi et al. | |
| 2017/0057081 A1* | 3/2017 | Krohne | B25J 5/007 |
| 2018/0111269 A1* | 4/2018 | Yamamoto | G01S 17/931 |
| 2018/0297204 A1* | 10/2018 | Krasny | B25J 9/1676 |
| 2018/0349654 A1* | 12/2018 | Takeshima | H04N 5/247 |
| 2019/0063907 A1* | 2/2019 | Grau | G01B 11/2545 |
| 2019/0070730 A1* | 3/2019 | Morioka | B25J 9/1666 |
| 2019/0262993 A1* | 8/2019 | Cole | B25J 9/1676 |
| 2020/0197108 A1* | 6/2020 | Usui | A61B 34/37 |

\* cited by examiner

FIG. 1
SIDE

FIG. 3
FRONT

PROTECTED WORKER ZONES AROUND MOBILE ROBOTIC PLATFORMS THAT MANUFACTURE AIRCRAFT

FIELD

This disclosure relates to the field of manufacturing and, in particular, to robots that fabricate aircraft.

BACKGROUND

Building a fuselage for an aircraft may include attaching skin panels to a support structure that provides structural rigidity. For example, the support structure may include hoop-wise frames and longitudinal elongated stringers, to which skin panels are attached. Together, the combination of skin panels and support structure defines a portion of the airframe of the aircraft.

Fastening operations and/or other work may be performed to join the skin panels and the support members together to form the fuselage. These operations may include, for example, drilling operations, riveting operations, interference-fit bolting operations, inspection, etc. Such operations may be performed in order to ensure that the fuselage meets outer mold line (OML) requirements and inner mold line (IML) requirements.

Within a manufacturing environment, (e.g., a factory floor, a work cell on the factory floor, etc.) robots may be utilized to perform the operations described above for forming fuselages for different aircraft. The robots may be placed onto mobile platforms that move around the work cells where the fuselages are built and also move between the work cells and a replenishment area (e.g., where the robots receive consumable assembly materials) and a maintenance area (e.g., where the robots are maintained and/or repaired).

However, the mobile platforms and the robots on the mobile platforms may move in unpredictable ways, which poses a hazard to human workers that also are present on the factory floor. Thus, a need exists to allow for the mobile platforms to operate as needed on the factory floor, while ensuring that the human workers are safe from injury.

SUMMARY

Mobile robotic platforms include a robotic device and a pair of laser scanners. The robotic device is positioned near a front of the mobile robotic platform while the laser scanners are positioned on the sides of the mobile robotic platform. When the mobile robotic platform is located in a selected position relative to an assembly with the front of the mobile robotic platform facing the assembly, the scanners are set to a scan field area of either a selected area for a safety zone around the sides of the mobile robotic platform or a default area within a predetermined distance from the sides. Upon detection of an intrusion into the scan field area of the laser scanners, the robotic device and/or the mobile robotic platform is stopped to prevent harm to a person whom may have inadvertently intruded into the scan field areas around the mobile robotic platform.

One embodiment comprises an apparatus that includes a mobile robotic platform, a robotic device, laser scanners, and a controller. The mobile robotic device moves to a selected position relative to an assembly. The robotic device is located on a front of the mobile robotic platform facing the assembly. The robotic device includes an end effector. A laser scanner on each side of the mobile platform output a signal upon detecting an intrusion within a selectable scan field area of each laser scanner. The controller determines whether the mobile robotic platform is located in the selected position relative to the assembly, and in response thereto, sends a signal to each laser scanner to set a scan field area for each laser scanner to either a selected area for a safety zone around sides of the mobile robotic platform or to a default area within a predetermined distance from the sides of the mobile robotic platform. In response to receiving a signal from a laser scanner that detects an intrusion, the controller stops at least one of the robotic device and the mobile robotic platform.

Another embodiment comprises a method of providing worker protected zones around a mobile robotic platform. The method comprises determining that a mobile robotic platform is located in a selected position relative to an assembly, where the mobile robotic platform includes a robotic device facing the assembly having an end effector and a laser scanner on each side of the mobile robotic platform that are configured to output a signal upon detecting an intrusion within a selectable scan field area of each laser scanner. The method further comprises setting a scan field area for each laser scanner to either a selected area for a safety zone around the sides of the mobile robotic platform or to a default area within a predetermined distance from the sides of the mobile robotic platform, receiving a signal from a laser scanner that detects an intrusion, and stopping at least one of the robotic device and the mobile robotic platform in response to the signal.

Another embodiment comprises a mobile robotic platform that includes a robotic device, a first scanner, a second scanner, and a controller. The robotic device is located on a front of the mobile robotic platform and has an end effector. The first scanner is on a first side of the mobile robotic platform and outputs a first signal upon detecting an intrusion within a first scan field area that is proximate to the first side. The second scanner is on a second side of the mobile robotic platform and outputs a second signal upon detecting an intrusion within a second scan field area that is proximate to the second side. The controller determines whether the mobile robotic platform is located in a selected position relative to an assembly, an in response thereto, sets a first size of the first scan field area and a second size of the second scan field area based on one or more variable factors. In response to the controller receiving either the first signal or the second signal, the controller stops at least one of the robotic device and the mobile robotic platform.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure are to be construed as being without limitation. As a result, this disclosure is not limited to the specific embodiments or examples described below, but by the claims and their equivalents.

Figure 1:
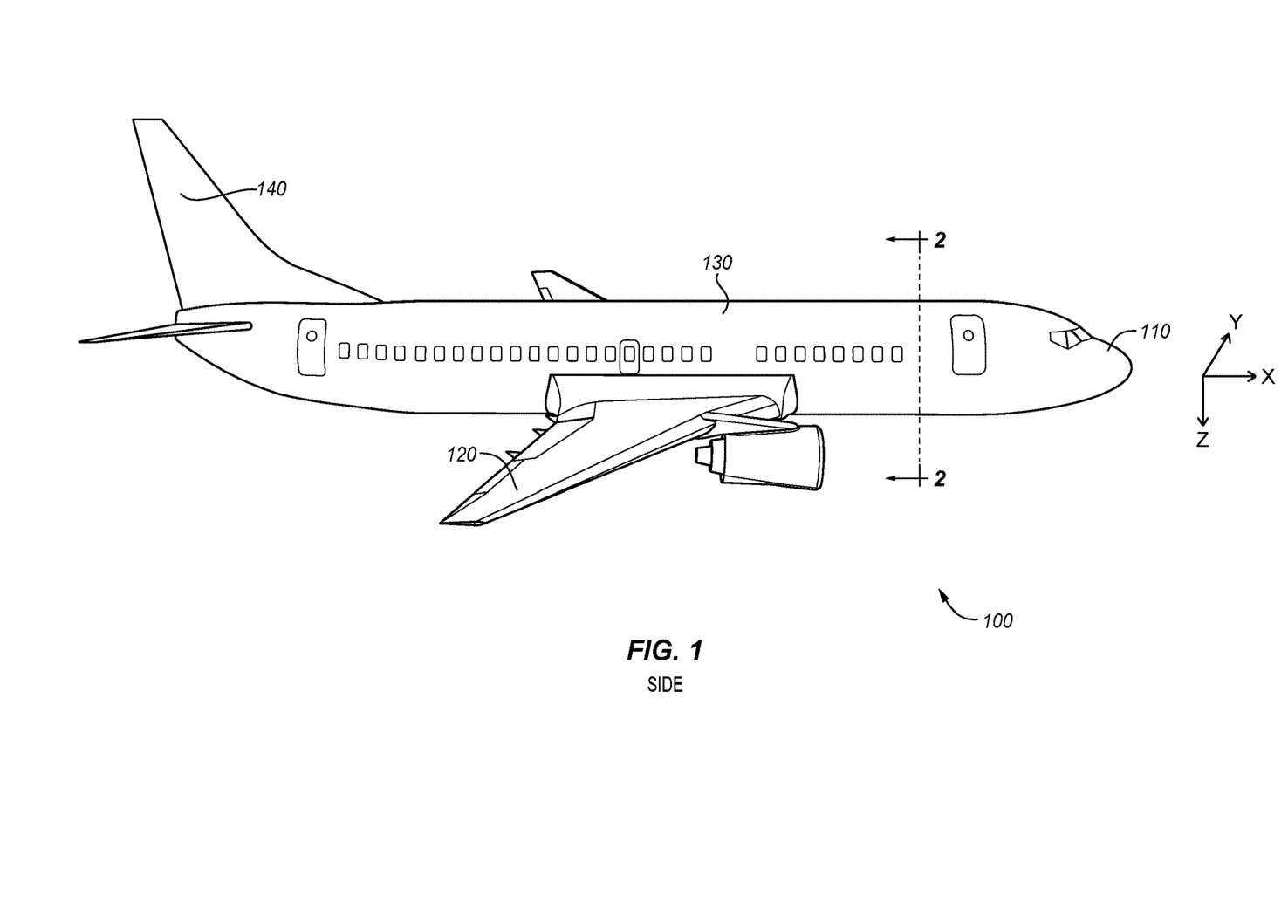
FIG. 1 depicts a side view of an aircraft in an illustrative embodiment.

FIG. 1 depicts a side view of an aircraft 100 in an illustrative embodiment. Aircraft 100 includes nose 110, wings 120, fuselage 130, and tail 140. FIG. 1 also illustrates a downward direction (Z) for aircraft 100. Although aircraft 100 has been depicted to have a particular configuration for purposes of discussion, aircraft 100 may have other configurations in other embodiments.

Figure 2:
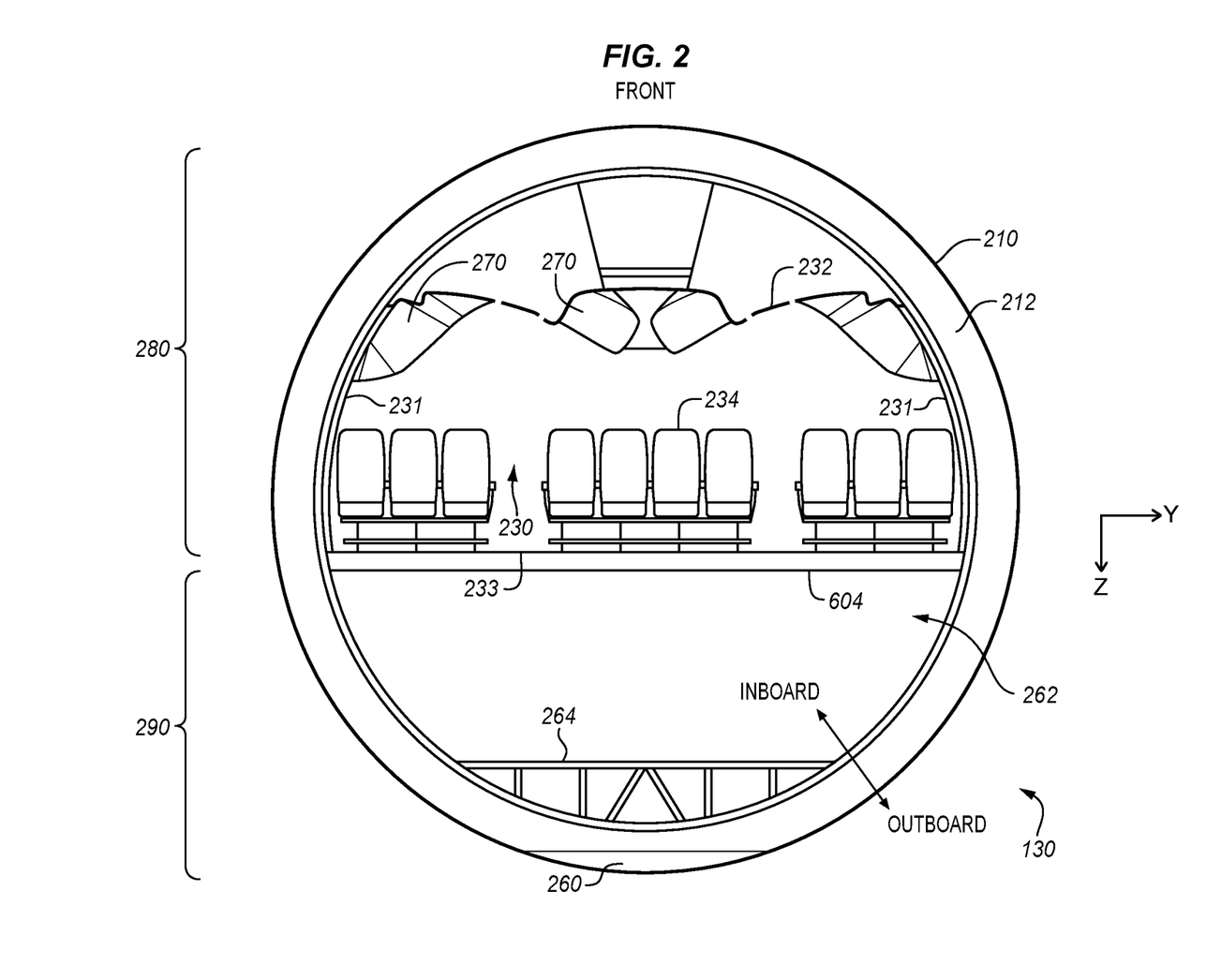
FIG. 2 depicts a cut-through front view of the aircraft corresponding to view arrows 2 in FIG. 1 in an illustrative embodiment.

FIG. 2 depicts a cut-through front view of aircraft 100 corresponding to view arrows 2 in FIG. 1 in an illustrative embodiment. In particular, FIG. 2 illustrates a cross sectional view of fuselage 130 for aircraft 100. Fuselage 130 includes an upper section 280, which includes a floor 233, a ceiling 232, and sidewalls 231 that form a cabin 230. Support members 212 (e.g., comprising hoopwise frames and longitudinally elongated stringers) enforce the shape of fuselage 130 and provide structural support. In this embodiment, seating 234 and storage 270 are also included. Fuselage 130 also includes a lower section 290, which includes drainage 260 located beneath cargo floor 264 of cargo area 262. FIG. 2 further illustrates that an outboard direction that proceeds towards an external surface (e.g., skin 210) of aircraft 100, and an inboard direction that proceeds towards the interior (e.g., cabin 230) of aircraft 100. As shown in FIG. 2, skin 210 surrounds fuselage 130.

Figure 3:
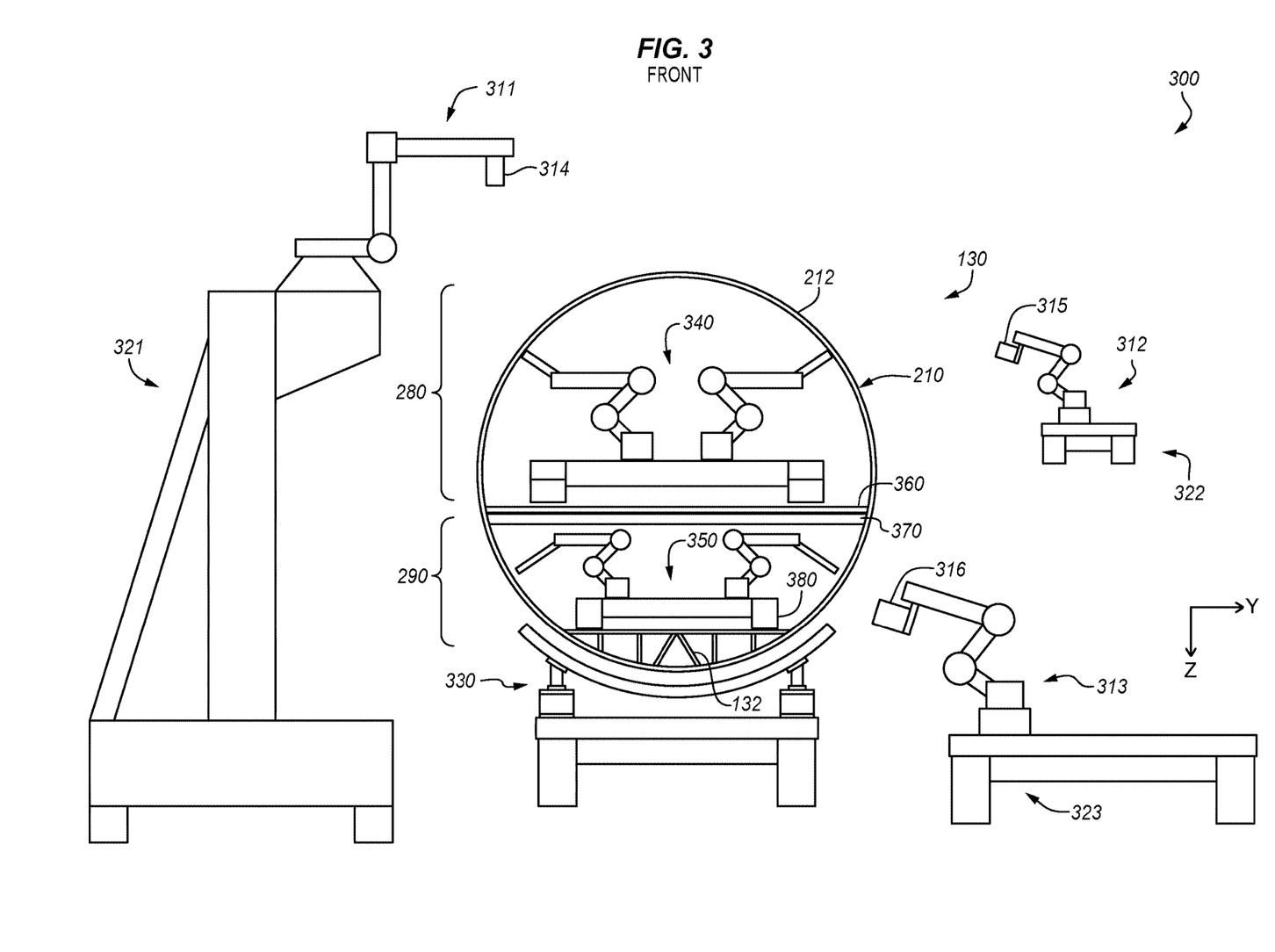
FIG. 3 is a front view of a manufacturing environment for a portion of a fuselage in an illustrative embodiment.

FIG. 3 is a front view of a manufacturing environment 300 for a portion of fuselage 130 in an illustrative embodiment. That is, FIG. 3 illustrates the same view of fuselage 130 as FIG. 2, but represents the environment in which fuselage 130 is fabricated. Hence, the differences between fuselage 130 in FIG. 2 and FIG. 3 are the result of the fabrication of fuselage 130 being completed in FIG. 2, and yet still in progress in FIG. 3.

Manufacturing environment 300 comprises any system operable to utilize automated processing by robots to assemble support members 212 of fuselage 130 and skin 210 together in order to form an airframe for aircraft 100. In this embodiment, manufacturing environment 300 includes fuselage 130, which is mounted onto cradle 330. Manufacturing environment 300 further includes robotic devices 311-313, which are mounted on mobile robotic platforms 321-323, respectively. Robotic devices 311-313 include end effectors 314-316, respectively, which are used during the fabrication process for fuselage 130. Any number of tools may be associated with end effectors 314-316. The tools associated with end effectors 314-316 may include, for example, drilling tools, fastener insertion tools, fastener installation tools, inspection tools, etc. Further, the tools associated with end effectors 314-316 may be exchanged with other tools located on their respective mobile robotic platform 321-323 to perform different operations (e.g., utilizing a plurality of tools stored by tool lockers found on their respective mobile robotic platform 321-323).

Mobile robotic platforms 321-323 may move along the floor to traverse fuselage 130 as desired in order to perform work on fuselage 130. Robotic devices 311-313 and mobile robotic platforms 321-323 coordinate their movements and actions with mobile tracked robot assembly 340 and robot assembly 350 within fuselage 130, in order to engage in fabrication operations that assemble fuselage 130 and/or affix skin 210 to support members 212 of fuselage 130. Robot assembly 340 performs work within upper section 280 of fuselage 130, while robot assembly 350 performs work within lower section 290 of fuselage 130. Furthermore, robot assembly 340 moves across a temporary floor 360 in upper section 280, which is mounted to joists 370. Robot assembly 350 moves across temporary floor 380 in lower section 290, which is mounted to structure 132.

During the manufacturing process, mobile robotic platforms 321-323 and robotic devices 311-313 may move autonomously to perform the steps used to fabricate fuselage 130, which can pose hazards to human workers on the factory floor. In the embodiments described herein, mobile robotic platforms 321-323 have been enhanced to protect human workers on the factory floor with scanners positioned to establish protective zones proximate to the mobile robotic platforms 321-323 that can trigger safety protocols (e.g., by automatically shutting down robotic devices 311-313 and/or mobile robotic platforms 321-323). One specific implementation of this functionality will be discussed with respect to mobile robotic platform 323, although the functionality described for mobile robotic platform 323 may apply equally to other mobile robotic platforms, such as mobile robotic platforms 321-322.

Figure 4:
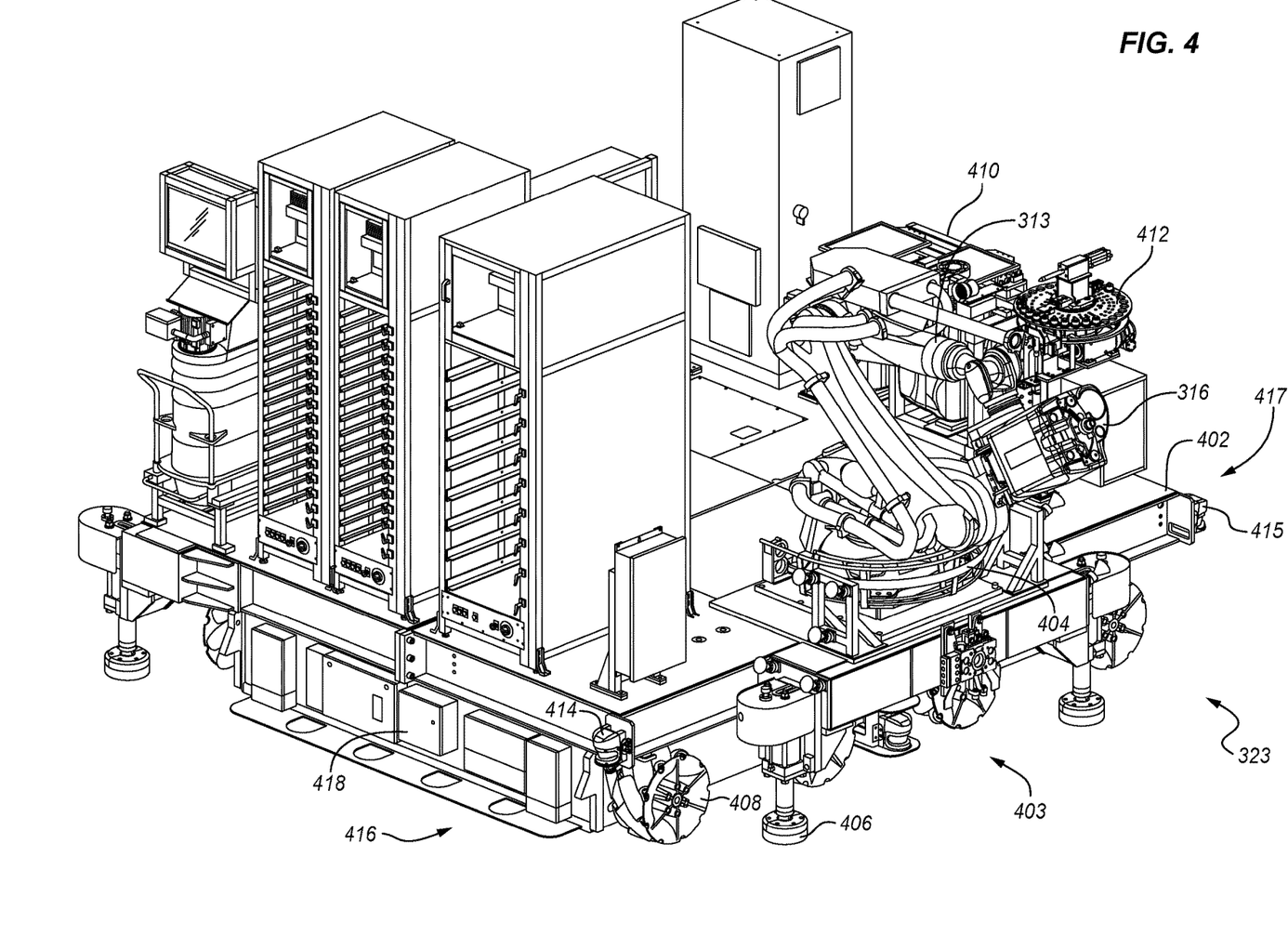
FIG. 4 is a perspective view of a mobile robotic platform in an illustrative embodiment.

FIG. 4 is a perspective view of mobile robotic platform 323 in an illustrative embodiment. In this embodiment, mobile robotic platform 323 includes a platform base 402, with robotic device 313 mounted to platform base 402 utilizing a movement system 404. Movement system 404 is configured to allow robotic device 313 to rotate. In this embodiment, robotic device 313 is located proximate to a front 403 of mobile robotic platform 323, although in other embodiments, robotic device 313 may be positioned differently on platform base 402. Mobile robotic platform 323 in this embodiment further includes hydraulic legs 406 that can be lowered towards the factory floor to provide stability to mobile robotic platform 323. Mobile robotic platform 323 further includes a plurality of omnidirectional wheels 408 which enable mobile robotic platform 323 to traverse within a work cell and perform a fabrication process on fuselage 130.

An end effector storage system 410 is located on mobile robotic platform 323, which is used to store different types of end effectors that may be utilized by robotic device 311 during the fabrication of fuselage 130. A tool magazine station 412 that is onboard mobile robotic platform 323 is used to store different types of tools that may be used during the fabrication of fuselage 130.

In this embodiment, mobile robotic platform 323 includes laser scanners 414-415 that are configured to selectively generate a definable scan field around mobile robotic platform 323. In particular, laser scanner 414 is configured to generate scan field around side 416 of mobile robotic platform 323, and laser scanner 415 is configured to generate a scan field around side 417 of mobile robotic platform 323. In some embodiments, laser scanners 414-415 may be located at a height of not more than thirty six inches from the factory floor. This height may be used to ensure that a person entering a scan field is detected.

Collectively, laser scanners 414-415 include any component, system, or device that selectively generates scan fields around mobile robotic platform 323. In the embodiments described herein, laser scanners 414-415 generate variable sized scan fields that are definable as desired. For instance, the area of the scan fields generated by laser scanners 414-415 may be changed in size based on the type of fabrication process being performed by robotic device 313, based on the position and/or reach of robotic device 313 with respect to mobile robotic platform 323, based on the speed at which robotic device 313 moves during fabrication of fuselage 130, and/or based on the speed at which mobile robotic platform 323 moves with respect to fuselage 130. The implementation of a variable sized scan field around mobile robotic platform 323 increases the safety of the human workers on the factory floor by dynamically adjusting the scan fields implemented around mobile robotic platform 323 based on a variety of different criteria.

Laser scanners 414-415 are operated by a controller 418 located on mobile robotic platform 323 in this embodiment, which may include one or more processors communicatively coupled to memory. However, controller 418 may be located somewhere other than on mobile robotic platform 323 in other embodiments. The functionality of controller 418 will be discussed later.

Figure 5:
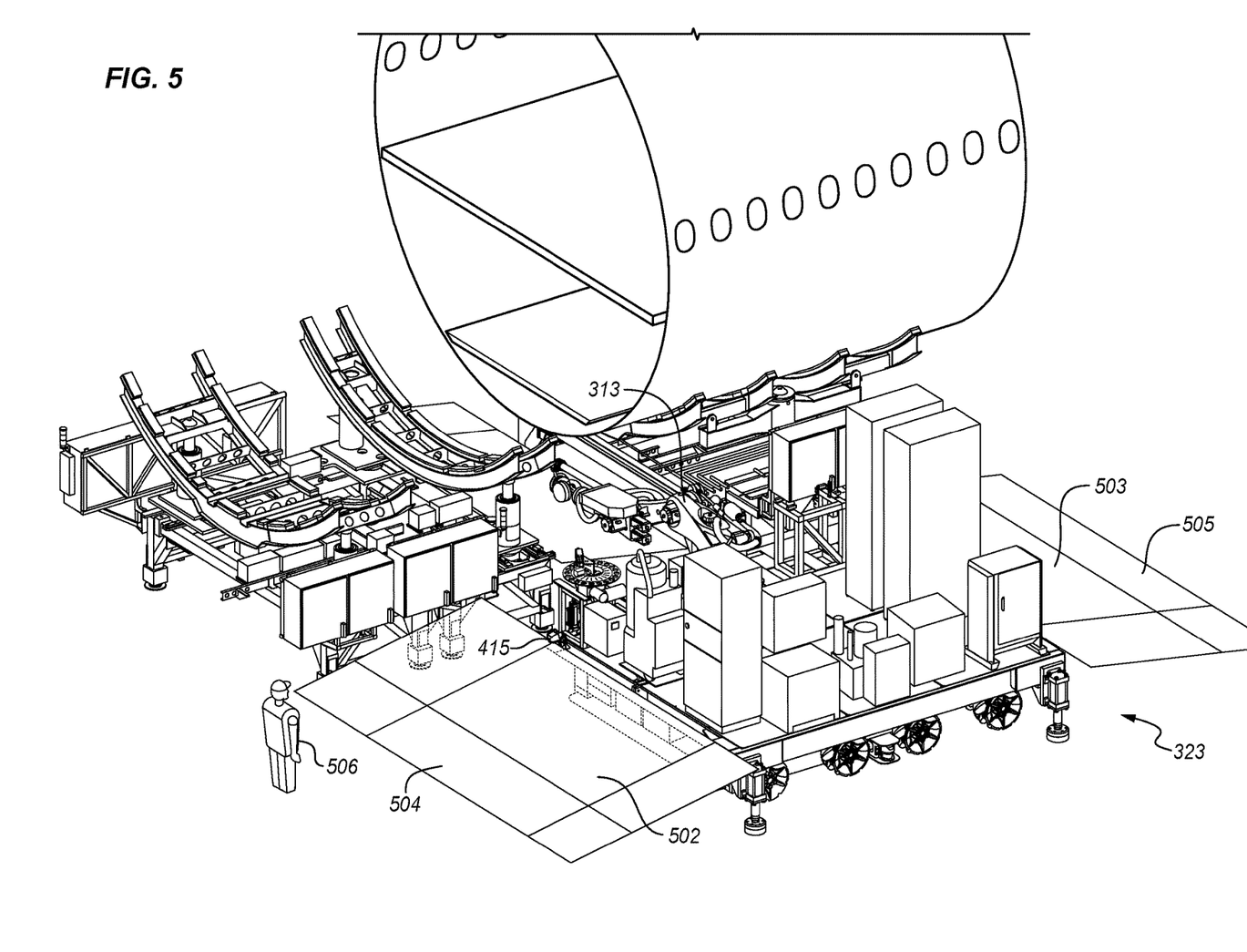
FIG. 5 is a perspective view of a mobile robotic platform, illustrating protected zones and warning zones around the mobile robotic platform in an illustrative embodiment.

FIG. 5 is a perspective view of mobile robotic platform 323, illustrating restricted zones 502-503 and warning zones 504-505 around mobile robotic platform 323 in an illustrative embodiment. Once mobile robotic platform 323 has moved to a programmed position and controller 418 has verified that mobile robotic platform 323 is located in the programmed position, controller 418 (or a processor of controller 418) is configured to set a defined scan field area for each of laser scanners 415-416 and activate each of laser scanners 415-416 for detecting intrusion in the scan field areas. In particular, any intrusion of a human worker 506 into warning zones 504-505 or restricted zones 502-504 may trigger an action performed by controller 418. For instance, if laser scanner 415 detects an intrusion by human worker 506 into warning zone 504, then controller 418 may generate an audible and/or visual warning to inform human worker 506 of the intrusion. If laser scanner 415 detects an intrusion by human worker 506 into restricted zone 502, then controller 418 may shut down robotic device 313 and/or mobile robotic platform 323. Similar activities may be performed in response to an intrusion by human worker 506 into warning zone 505 and/or restricted zone 503. This ensures that human worker 506 is not harmed by the actions performed by robotic device 313 and/or mobile robotic platform 323.

Figure 6:
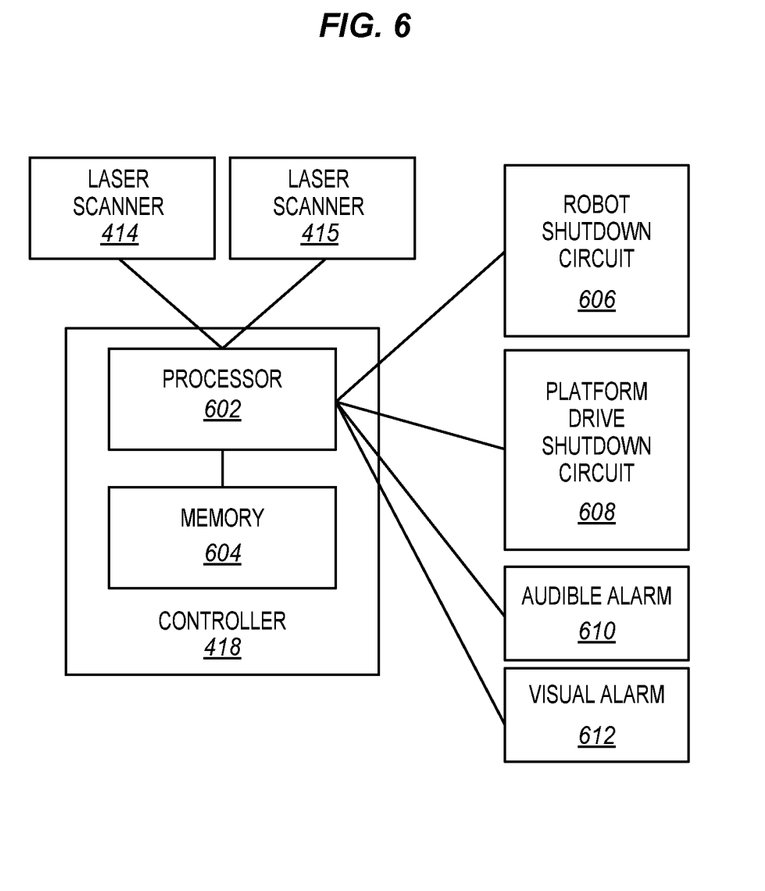
FIG. 6 is a block diagram of a controller for a mobile robotic platform in an illustrative embodiment.

FIG. 6 is a block diagram of controller 418 in an illustrative embodiment. While the specific hardware implementation of controller 418 is subject to design choices, one particular embodiment may include one or more processors 602 coupled with memory 604. Processor 602 includes any hardware device that is able to perform functions. For example, processor 602 may receive data from laser scanners 414-415 regarding an intrusion into warning zones 504-505 around mobile robotic platform 323, and activate an audible alarm 610 and/or a visual alarm 612 to warn human worker 506 of the intrusion. Processor 602 may also receive data from laser scanners 415-416 regarding an intrusion into restricted zones 502-503 around mobile robotic platform 323, and activate a robot shutdown circuit 606 and/or a platform drive shutdown circuit 608 to stop robotic device 313 and/or mobile robotic platform 323, respectively.

Processor 602 may include one or more Central Processing Units (CPU), microprocessors, Digital Signal Processors (DSPs), Application-specific Integrated Circuits (ASICs), etc. Some examples of processors include INTEL® CORE™ processors, Advanced Reduced Instruction Set Computing (RISC) Machines (ARM®) processors, etc.

Memory 604 includes any hardware device that is able to store data. For instance, memory 604 may store information regarding the sizes of warning zones 504-505 and/or restricted zones 502-503 that are implemented based on various criteria, including speeds, processes, directions, locations, etc., with respect to robotic device 313 and/or mobile robotic platform 323. Memory 604 may include one or more volatile or non-volatile Dynamic Random-Access Memory (DRAM) devices, FLASH devices, volatile or non-volatile Static RAM devices, hard drives, Solid State Disks (SSDs), etc. Some examples of non-volatile DRAM and SRAM include battery-backed DRAM and battery-backed SRAM.

Consider that mobile robotic platform 323 is traversing within a work cell that is being used to fabricate a portion of fuselage 130. For example, mobile robotic platform 323 may autonomously move to a work cell to begin or continue a fabrication process on fuselage 130.

Figure 7:
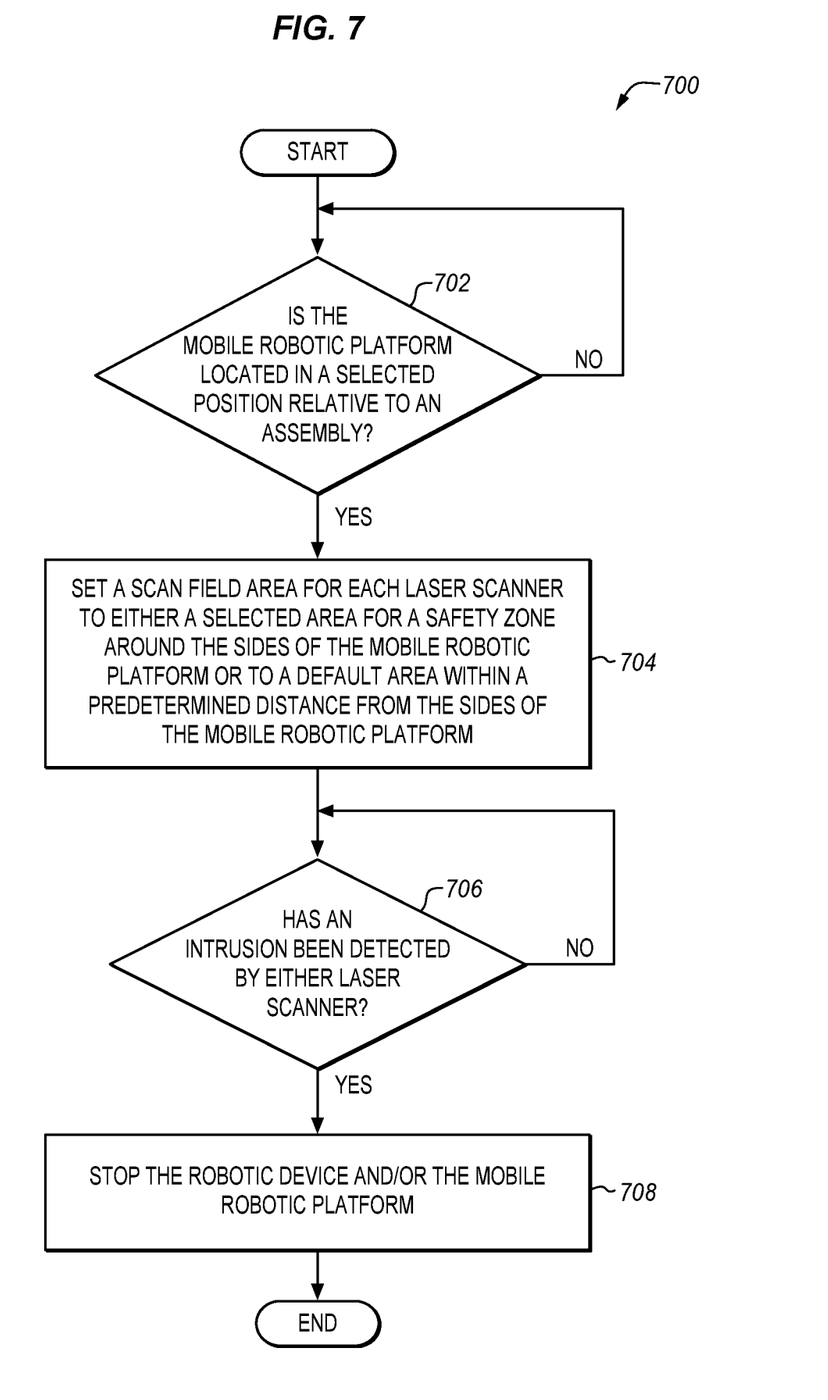
FIG. 7 illustrates a method of providing worker protected zones around a mobile robotic platform in an illustrative embodiment.

FIG. 7 illustrates a method 700 of providing worker protected zones around a mobile robotic platform in an illustrative embodiment. The steps of method 700 will be described with respect to mobile robotic platform 323, although the steps may be performed by other mobile robotic platforms, not shown. The steps are not all inclusive, and may include other steps, not shown. Further, the steps may be performed in an alternate order.

Processor 602 of controller 418 (see FIG. 6) monitors the movement of mobile robotic platform 323 to determine when mobile robotic platform 323 has reached its programmed position relative to fuselage 130 (see step 702). For instance, mobile robotic platform 323 may receive instructions from a work cell controller (not shown) to position itself relative to fuselage 130 in order to perform a fabrication process on fuselage 130. During the repositioning phase, mobile robotic platform 323 may be monitored by sensors in the work cell which pass positional information to processor 602. Or, processor 602 may utilize sensors onboard mobile robotic platform 323 to determine its position relative to fuselage 130. When in the programmed position, mobile robotic platform 323 has front 403 facing fuselage 130, which allows robotic device 313 to utilize its end effector 316 to perform a fabrication process on fuselage 130. Once mobile robotic platform 323 is located in the programmed position, processor 602 sets a scan field area for each laser scanner 414-415 (see step 704). In some cases, the scan field area is set to a default area having a pre-determined distance from sides 416-417 of mobile robotic platform 323. This default area may be, for instance, may be a pre-determined distance that is based on the reach of robotic device 313 beyond sides 416-417 of mobile robotic platform 323. This default area may provide a minimum area of safety around mobile robotic platform 323. In other example, the scan field area is set based on the known distance or spacing between the programmed positions of adjacently positioned mobile robotic devices, to thereby scan the entire area between the adjacent mobile robotic devices. Accordingly, controller 418 may be configured to send a signal to each of laser scanners 414-415 to set a scan field area for each of laser scanners 414-415, to either a selected area for a safety zone around sides 416-417 of mobile robotic platform 323 or to a default area within a predetermined distance from sides 416-417 of mobile robotic platform 323, after which each of laser scanners 414-415 detects intrusion by persons entering the defined safety zones.

In other cases, the scan field area is set to a variable sized area that may be based on a number of factors. One such factor may include the speed of robotic device 313. For instance, if the speed of the robotic device 313 is high, then a larger safety zone around mobile robotic platform 323 (e.g., a zone larger than the default area) may be implemented to ensure that enough time is allowed for a shutdown of robotic device 313 if an intrusion is detected. Another factor may include the movement and/or position of robotic device 313. For instance, if robotic device 313 is operating near the end of its reach on side 416, then a larger safety zone may be implemented on side 416 as compared to side 417 to ensure that enough time is allowed for a shutdown of robotic device 313 if an intrusion is detected. If an intrusion is detected (see step 706), then processor 602 will stop robotic device 313 and/or mobile robotic platform 323 (see step 708).

In some cases, processor 602 may operate to stop or suspend operation of robotic device 313 if an intrusion is detected, as previously described. However, in other cases, mobile robotic platform 323 may be in motion within a work cell in order to reposition robotic device 313 to a different portion of fuselage 130. For instance, mobile robotic platform 323 may utilize omnidirectional wheels 408 (see FIG. 4) to move parallel to fuselage 130 to continue a fabrication process. During the move, the scan field areas for laser scanners 414-415 may be dynamically adjusted to ensure that workers in the cell are protected from hazards. For instance, if mobile robotic platform 323 moves in a direction of side 416, then the scan field area set for laser scanner 414 may be set based on the speed of mobile robotic platform 323 to ensure that enough time is allowed for a shutdown of mobile robotic platform 323.

The use of dynamic protection zones around mobile robotic platforms increases the safety of workers on the factor floor by ensuring that the activities being performed are a factor in how the protection zones are defined. Dynamic zones are adjustable based on a number of factors, which ensures that enough time remains after detecting an intrusion to suspend or stop operation of the robotic devices and/or the mobile robotic platforms.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof

What is claimed is:

1. An apparatus, comprising:
   a mobile robotic platform, comprising:
      a platform base having a front, a back, and sides;
      a robotic device located proximate to the front of the platform base, wherein the robotic device includes an end effector;
      a laser scanner on each of the sides of the platform base, each laser scanner configured to output a signal upon detecting an intrusion within a selectable scan field area; and
      a plurality of wheels mounted to the platform base that are configured to move the mobile robotic platform across a factory floor; and
   a controller configured to actuate the wheels of the mobile robotic platform to move the mobile robotic platform from a first position on the factory floor to a second position on the factory floor, and to orient the front of the platform base and the robotic device proximate to an assembly,
   the controller configured to, in response to orienting the front of the platform base and the robotic device proximate to the assembly, to send a signal to each laser scanner to set a scan field area to either a selected area for a safety zone around the sides of the mobile robotic platform or to a default area within a predetermined distance from the sides of the mobile robotic platform,
   wherein upon setting the scan field area for each laser scanner, the controller is configured to stop a movement of at least one of the robotic device and the mobile robotic platform in response to receiving a signal from a laser scanner that detects an intrusion.

2. The apparatus of claim 1, wherein:
   the default area for the predetermined distance from the sides of the mobile robotic platform corresponds to a reach of the robotic device.

3. The apparatus of claim 1, wherein:
   each laser scanner is positioned at a height not more than thirty six inches from the factory floor to detect an intrusion by a person within the selectable scan field area of each laser scanner.

4. The apparatus of claim 1, wherein:
   the controller is configured to actuate the wheels of the mobile robotic platform to perform a parallel move of the mobile robotic platform from the second position proximate to the assembly to a third position proximate to the assembly, and to vary the selected area of the safety zone based on a speed of the mobile robotic platform during the parallel move.

5. The apparatus of claim 4, wherein:
the assembly comprises a fuselage of an aircraft.

6. The apparatus of claim 1, wherein:
the selected area for the safety zone is based on at least one of a speed of the robotic device and a reach of the robotic device.

7. The apparatus of claim 1, wherein:
the controller is configured to actuate the wheels of the mobile robotic platform to perform a parallel move of the mobile robotic platform from the second position proximate to the assembly to a third position proximate to the assembly, and to vary the selected area for the safety zone based on a direction of movement of the mobile robotic platform during the parallel move.

8. The apparatus of claim 1, wherein:
the safety zone comprises a warning zone that is distal to the sides of the mobile robotic platform and a restricted zone that is proximate to the sides of the mobile robotic platform,
the controller is configured to generate at least one of an audible warning and a visual warning in response to receiving a signal from a laser scanner that detects an intrusion into the warning zone,
the controller is configured to stop the movement of at least one of the robotic device and the mobile robotic platform in response to receiving a signal from a laser scanner that detects an intrusion into the restricted zone.

9. A method, comprising:
actuating wheels of a mobile robotic platform to move the mobile robotic platform from a first position on a factory floor to a second position on the factory floor, wherein the mobile robotic platform includes a platform base having a front, a back, sides, a robotic device located proximate to the front with an end effector, and a laser scanner on each of the sides of the mobile robotic platform, each laser scanner configured to output a signal upon detecting an intrusion within a selectable scan field area;
orienting the front of the platform base and the robotic device proximate to an assembly;
setting a scan field area for each laser scanner to either a selected area for a safety zone around the sides of the mobile robotic platform or to a default area within a predetermined distance from the sides of the mobile robotic platform in response to orienting the front of the platform base and the robotic device proximate to the assembly;
receiving a signal from a laser scanner that detects an intrusion; and
stopping a movement of at least one of the robotic device and the mobile robotic platform in response to the signal.

10. The method of claim 9, wherein setting the scan field area further comprises:
setting the default area for the predetermined distance from the sides of the mobile robotic platform based on a reach of the robotic device.

11. The method of claim 9, further comprising:
actuating the wheels of the mobile robotic platform to perform a parallel move of the mobile robotic platform from the second position proximate to the assembly to a third position proximate to the assembly; and
varying the selected area of the safety zone based on a speed of the mobile robotic platform during the parallel move.

12. The method of claim 9, wherein setting the scan field area further comprises:
determining a speed of the robotic device; and
setting the selected area for the safety zone based on the speed of the robotic device.

13. The method of claim 9, wherein setting the scan field area further comprises:
determining a reach of the robotic device; and
setting the selected area for the safety zone based on the reach of the robotic device.

14. The method of claim 9, further comprising:
actuating the wheels of the mobile robotic platform to perform a parallel move of the mobile robotic platform from the second position proximate to the assembly to a third position proximate to the assembly; and
setting the selected area for the safety zone based on a direction of the parallel move.

15. The method of claim 9, wherein:
setting the scan field area further comprises:
creating a safety zone comprising a warning zone that is distal to the sides of the mobile robotic platform and a restricted zone that is proximate to the sides of the mobile robotic platform;
the method further comprises:
generating at least one of an audible warning and a visual warning in response to receiving a signal from a laser scanner that detects an intrusion into the warning zone; and
stopping the movement of at least one of the robotic device and the mobile robotic platform in response to receiving a signal from a laser scanner that detects an intrusion into the restricted zone.

16. A method operable by a mobile robotic platform including a robotic device, a movement system, and at least one scanner, the method comprising:
actuating the movement system to move the mobile robotic platform from a first position on a factory floor to a second position on the factory floor to orient the robotic device proximate to a fuselage of an aircraft;
determining a type of fabrication process being performed by the robotic device;
setting a scan field area for the at least one scanner to a selected area for a safety zone around sides of the mobile robotic platform based on the type of fabrication process being performed;
performing the fabrication process on the fuselage using at least one end effector of the robotic device;
receiving a signal from the at least one scanner that detects an intrusion into the selected area of the safety zone during the fabrication process; and
stopping a movement of the robotic device in response to receiving the signal.

17. The method of claim 16, further comprising:
actuating the movement system to perform a parallel move of the mobile robotic platform from the second position proximate to the fuselage to a third position proximate to the fuselage;
varying the selected area of the safety zone based on a speed of the mobile robotic platform during the parallel move;
receiving a signal from the at least one scanner that detects an intrusion into the selected area of the safety zone during the parallel move; and
stopping a movement of the mobile robotic platform in response to receiving the signal.

18. The method of claim 16, further comprising:
actuating the movement system to perform a parallel move of the mobile robotic platform from the second position proximate to the fuselage to a third position proximate to the fuselage;
varying the selected area of the safety zone based on a direction of movement of the mobile robotic platform during the parallel move;
receiving a signal from the at least one scanner that detects an intrusion into the selected area of the safety zone during the parallel move; and
stopping a movement of the mobile robotic platform in response to receiving the signal.

19. The method of claim 16, wherein:
setting the scan field area further comprises:
creating a safety zone comprising a warning zone that is distal to the sides of the mobile robotic platform and a restricted zone that is proximate to the sides of the mobile robotic platform;
the method further comprises:
generating at least one of an audible warning and a visual warning in response to receiving a signal from a laser scanner that detects an intrusion into the warning zone; and
stopping the movement of at least one of the robotic device and the mobile robotic platform in response to receiving a signal from a laser scanner that detects an intrusion into the restricted zone.

20. The method of claim 16, wherein setting a scan field area further comprises:
determining a distance between the mobile robotic platform and an adjacent mobile robotic platform; and
setting the selected area for the safety zone based on the distance.

21. The method of claim 16, wherein:
the safety zone comprises a restricted zone around the mobile robotic platform and a warning zone around the restricted zone, and
the method further comprises:
generating at least one of an audible warning and a visual warning to alert a worker in response to receiving a signal from a laser scanner that detects an intrusion into the warning zone; and
shutting down the robotic device in response to receiving a signal from a laser scanner that detects an intrusion into the restricted zone.

22. The method of claim 16, wherein:
the safety zone includes a dynamic protection zone, and
the method further comprises:
adjusting a range of the dynamic protection zone based on at least one factor including a speed of the robotic device, such that the range ensures that the movement of the robotic device is stopped after detecting an intrusion into the dynamic protection zone.

23. The apparatus of claim 1, wherein:
the safety zone comprises a restricted zone around the mobile robotic platform and a warning zone around the restricted zone, and
the controller is configured to generate at least one of an audible warning and a visual warning to alert a worker in response to receiving a signal from a laser scanner that detects an intrusion into the warning zone, and to shut down the robotic device in response to receiving a signal from a laser scanner that detects an intrusion into the restricted zone.

24. The apparatus of claim 1, wherein:
the safety zone includes a dynamic protection zone, and
the controller is configured to adjust a range of the dynamic protection zone based on at least one factor including a speed of the robotic device, such that the range ensures the movement of the robotic device is stopped after detecting an intrusion into the dynamic protection zone.

* * * * *